United States Patent [19]

Wong

[11] Patent Number: 5,319,204
[45] Date of Patent: Jun. 7, 1994

[54] POSITRON EMISSION TOMOGRAPHY CAMERA WITH QUADRANT-SHARING PHOTOMULTIPLIERS AND CROSS-COUPLED SCINTILLATING CRYSTALS

[75] Inventor: Wai-Hoi Wong, Houston, Tex.

[73] Assignee: Board of Regents, The University of Texas System, Austin, Tex.

[21] Appl. No.: 882,344

[22] Filed: May 13, 1992

[51] Int. Cl.[5] .............................................. G01T 1/20
[52] U.S. Cl. ............................ 250/363.03; 250/363.04
[58] Field of Search ...................... 250/363.03, 363.04, 250/363.06

[56] References Cited

U.S. PATENT DOCUMENTS

| | | |
|---|---|---|
| 4,733,083 | 3/1988 | Wong . |
| 4,743,764 | 5/1988 | Casey et al. . |
| 4,883,966 | 11/1989 | Wong . |
| 5,032,728 | 7/1991 | Chang et al. ................... 250/363.03 |
| 5,091,650 | 2/1992 | Uchida et al. ................... 250/363.03 |

OTHER PUBLICATIONS

W. Wong et al., "Characteristics of Small Barium Fluoride ($BaF_2$) Scintillator for High Intrinsic Resolution of Time-of-Flight Positron Emission Tomography," *IEEE Trans. on Nuclear Sci.*, vol. NS-31, pp. 381-386 (Feb. 1984).

W. Chang, et al., "A Multi-Detector Cylindrical Spect System for Phantom Imaging," *IEEE*, 90CH2975 pp. 1208-1211 (May 1990).

Wong, Wai-Hoi, et al., "A Slanting Light-Guide Analog Decoding High Resolution Detector for Positron Emission Tomography Camera", *IEEE Transactions on Nuclear Science*, vol. NS-34, pp. 280-284, 1987.

Seiichi Yamamoto, et al., "A BGO Detector Unit for a Stationary High Resolution Positron Emission Tomograph", *J. of Computer Assisted Tomography*, vol. 10(5), pp. 851-855.

*Primary Examiner*—Paul M. Dzierzynski
*Assistant Examiner*—Richard Hanig
*Attorney, Agent, or Firm*—Arnold, White & Durkee

[57] ABSTRACT

A positron emission topography camera is provided having an array of scintillation crystals placed adjacent other arrays to form an arcuate detection surface surrounding a patient area. Alternatively, the arrays may be placed in a planar configuration on opposing sides of the patient area. Either a three-dimensional image or a two-dimensional image can be formed from a patient's body placed within the patient area. Moreover, the edges between the arrays of crystals are offset in relation to the edges between the light detectors. Each light detector is suitably positioned adjacent four adjacent quadrants of four respective arrays to simultaneously detect radiation emitted from the four quadrants of each array. Moreover, each crystal within the array is selectively polished and selectively bonded to adjacent crystals to present a cross-coupled interface which can tunably distribute light to adjacent light detectors.

25 Claims, 3 Drawing Sheets

POSITRON EMISSION TOMOGRAPHY CAMERA WITH QUADRANT-SHARING PHOTOMULTIPLIERS AND CROSS-COUPLED SCINTILLATING CRYSTALS

BACKGROUND OF THE INVENTION

1. Field of the Invention

This invention relates to gamma or positron emission tomography (PET) cameras.

2. Description of the Relevant Art

A PET camera consists of a polygonal or circular ring of radiation detection sensors 10 placed around a patient area 11, as shown in FIG. 1. Radiation detection begins by injecting isotopes with short half-lives into a patient's body placeable within patient area 11. The isotopes are absorbed by target areas within the body causing the isotope to emit positrons that are detected when they generate gamma rays. When in the human body, the positrons collide with electrons and the two annihilate each other, releasing gamma rays. The emitted rays move in opposite directions, leave the body and strike the ring of radiation detectors 10.

The ring of detectors 10 includes an inner ring of scintillator crystals 12 and an outer ring of light detectors or photomultiplier tubes 14. The scintillator crystals respond to the incidence of gamma rays by emitting a flash of photon energy (scintillation) that is then converted into electronic signals by a corresponding adjacent photomultiplier tube 14. A computer records the location of each energy flash and then plots the source of radiation within the patient's body by comparing flashes and looking for pairs of flashes that arise from the same positron-electron annihilation point. It then translates that data into a PET scan image. The PET monitor displays the concentration of isotopes in various colors indicating level of activity. The resulting PET scan image indicates a transaxial view of neoplasms or tumors existing in the patient's body.

Early PET scanners required a single photomultiplier tube to be coupled to a single scintillator crystal. A crystal can be made very narrow (e.g., 1 mm), but the smallest available photomultiplier tube (PMT) is somewhat large (e.g., 10 mm). Hence, a practical advance in PET scanners allows a single PMT to service several crystals. As disclosed in my U.S. Pat. Nos. 4,733,083 and 4,883,966 a single PMT can service several crystals. A single PMT may alone cost $250, and by using a minimum number of PMTs, the cost of the PET camera can be drastically reduced. Moreover, since PMTs are fairly large in size, it is important that several crystals be associated with that PMT so as to increase the resolution of the PET camera. Crystals can be cut very narrow; the thinner the crystal, the greater the resolution of the PET camera but, only if the crystal location can be accurately decoded.

As shown in FIG. 3, two PMTs 14a and 14b can service a row of eight scintillation crystals 12. The eight crystals are formed from a unitary crystal block 16. As described in U.S. Pat. No. 4,743,764, each crystal 12 is formed by placing slots or cuts 18 at varying depths into block 16. The depth of each cut determines the amount of photon energy being directed to a respective PMT 14a or 14b. For example, crystal 12a is formed having a cut 18 placed the entire depth of block 16 and separating crystal 12a from crystal 12b. Photon energy generated within crystal 12a is directed entirely into the right-side PMT 14a. Typically, cut 18 is filled with light reflecting materials or the sides of the cut are polished so as to effectively prevent photon energy from passing across cuts. Shortening the depth of cut 18 will allow photon energy to be directed along the shortened cut distance and then disperse past the cut edge. For example, photon energy within crystal 12b will disperse toward the center of the block to both PMT 14a and 14b. Photon energy will predominantly strike PMT 14a; however, some energy will strike PMT 14b due to the absence of cut 18 extending the entire depth of the left hand side of crystal 12b.

The layout of scintillator crystals 12 is in three dimensions. FIG. 3 illustrates the x and z axes of eight crystals within a single block 16. However, FIG. 4 illustrates the x and y axes of four blocks 16, each block adjacent four PMTs 14. Typically an array of crystals are formed between cuts within a block. The blocks are then joined side-by-side to preferably form a ring surrounding the patient area. In two dimensions (x and y), a single PMT 14 can, for example, service sixteen crystals 12 (i.e., a 4×4 array of crystals 12) as shown in FIG. 4. Likewise, four PMTs can service a block or 8×8 array of crystals.

Shown in FIGS. 2–4 are various conventional crystal/PMT arrangements which typically involve placement of the outer edge of a PMT adjacent to and aligned with the outer edge of an array of crystals 12 (or edge of a block 16). For purposes of isolating the specific crystal being scintillated, it is important the photon energy sent to the respective PMT identify where, within the array of crystals serviced by the PMT, that the scintillation occurred. Scintillation occurring within one crystal is often directed to one of many PMTs associated with the entire block of crystals. If, for example, crystal H is scintillated, then all photon energy will be directed to PMT 14b due to cut 18 being the entire depth of the crystal block as shown in FIG. 3. If crystal N is scintillated, then photon energy will be primarily directed to PMT 14b; however, PMT 14a, 14e and 14f will also receive photon energy. If the location of scintillation is nearer the center of the array (e.g., Crystal C' is scintillated), then PMT 14b will read only slightly more photon energy than PMTs 14a, 14e and 14f. By determining the relative amounts of photon energy received by four PMTs associated with a single array or block, the relative X and Y location of scintillation can be determined within that array or block, the resolution of the X and Y location being directly proportional to the width of each crystal 12. Of course, it is implicit that the system must be capable of decoding the crystal locations.

Unfortunately, with the outer edge of the array being aligned with and adjacent to the outer edge of the PMT's (i.e., two sides of each PMT), there is an upper limit on the size of the PMT in relation to the size of the array. If, for example, two (as opposed to four) PMTs service a single array, then predominate photon energy in one PMT indicates that scintillation occurred at the left (or upper) half of the array as opposed to the right (or lower) half. Thus, only single axis (e.g., X axis) detection is possible. Unfortunately, single axis detection is not sufficient to identify with precision the exact location of scintillation within the block or array. There must be a double axis detection scheme whereby both the X and Y location of each scintillation is detectable. If, for example, a single PMT services a single array, no indicia whatsoever of the location scintillation with the array can be determined. The PMT cannot differentiate where, within the serviced array, the scintillation occurred. Thus, as long as conventional detection schemes utilize "non-offset" PMT/array edges, the number of PMTs per array cannot be effectively decreased.

SUMMARY OF THE INVENTION

Problems outlined above are in large part solved by the device and method of the present invention. That is, the PET camera of the present invention is constructed of scintillating crystal arrays placed adjacent to a plurality of PMT arrays. The crystal arrays and the PMT arrays are offset in both the x and y axes such that each crystal array is directly adjacent and optically coupled to four adjacent quadrants of four adjacent PMTs. The quadrant-sharing scheme of the present invention can be used to reduce the number of PMTs needed, thereby reducing the cost of the PET camera. Alternatively, the quadrant-sharing scheme may used to decrease the size of each scintillating crystal to achieve higher spatial resolution without increasing the number of PMTs.

According to another aspect of the present invention, crystals within each array are tightly packed and coupled together to form a highly efficient gamma ray detecting surface. The adjoining surface of each crystal may have a polished or non-polished finish placed at select locations upon the surface depending upon the specific location of the crystal within the block and the targeted cross-coupling of light between crystals. Optical adhesives may also be selectively placed between crystals to couple the crystals within the array and, depending upon where the adhesives are placed, to fine-tune the cross-coupled light distribution to the PMT. Thus, the present embodiment does not require grooves be placed into the block via conventional saw blades, etc. Instead, the block or array of the present invention is formed by tightly bonding separate crystal elements together to form the array. By selectively polishing the adjacent surfaces of separate crystals and then selectively bonding those surfaces with light controlling adhesives, the crystals of the resulting array are optically cross-coupled with substantially no gaps therebetween. The cross-coupling scheme of the present embodiment is advantageously used to increase the radiation detection efficiency of the crystals by substantially limiting the gap between the crystals.

Broadly speaking, the present invention is directed to a PET camera comprising an array of scintillation crystals. The resulting array may be placed in an arcuate or inwardly angled position with an adjacent array to surround a patient area and detect radiation emitted from the patient area. Alternatively, the resulting array may be placed in a planar position with adjacent arrays. A pair of resulting planes can be placed on opposing side of the patient area. A light detector, such as a PMT, may be positioned adjacent four adjacent quadrants of four respective arrays to detect radiation emitted from each array. The edge of each array is in an offset position relative to the edge of each PMT.

According to one aspect of the present invention, each array may comprise at least 64 scintillation crystals. Accordingly, a single PMT can service four adjacent arrays associated with a total of 4×64=256 crystals. As such, the present invention contemplates a large PMT equal in size to four quadrants of an array (or a single array). By offsetting the PMT/array edges in relation to each other, PMT size can therefore be increased over conventional designs thereby reducing the number of PMTs needed.

According to another aspect of the present invention, instead of increasing the PMT size, PMTs may be left small but are capable of servicing even smaller crystals within small arrays. For example, instead of being useable with crystals of 5 mm wide, the present invention is useable with crystals equal to or less than 2.5 mm wide. A resulting increase in resolution is thereby achieved.

The present invention is also directed to a method of detecting the location and size of neoplasms or tumors within a patient. The method comprises the steps of receiving gamma rays from a patient upon four adjacent arrays of scintillation crystals. The gamma rays striking four adjacent quadrants of four separate blocks or arrays are then converted to photon energy which is then partially detectable by a light detector. The tumor location can be isolated according to the proportion of photon energy detectable by the detector in relation to remaining photon energy detectable by adjacent light detectors.

BRIEF DESCRIPTION OF THE DRAWINGS

Other objects and advantages of the invention will become apparent upon reading the following detailed description and upon reference to accompanying drawings in which.

Figure 1:
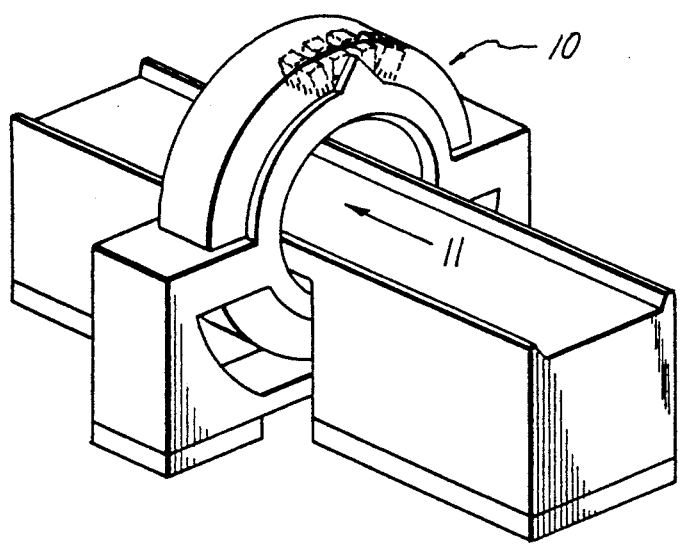
FIG. 1 is a perspective elevational view of a PET camera.
Figure 2:
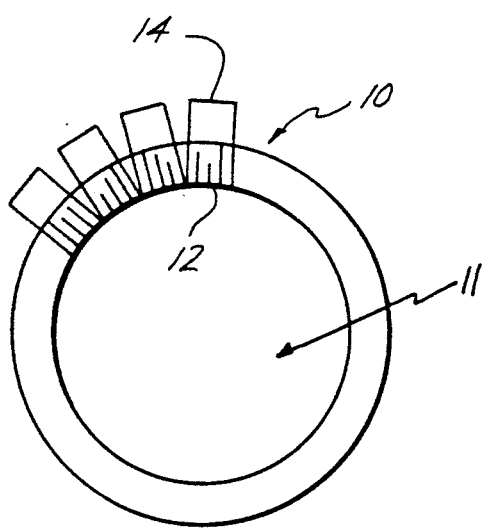
FIG. 2 is a schematic cross-sectional view of one plane of crystals and light detectors of a conventional PET camera.
Figure 3:
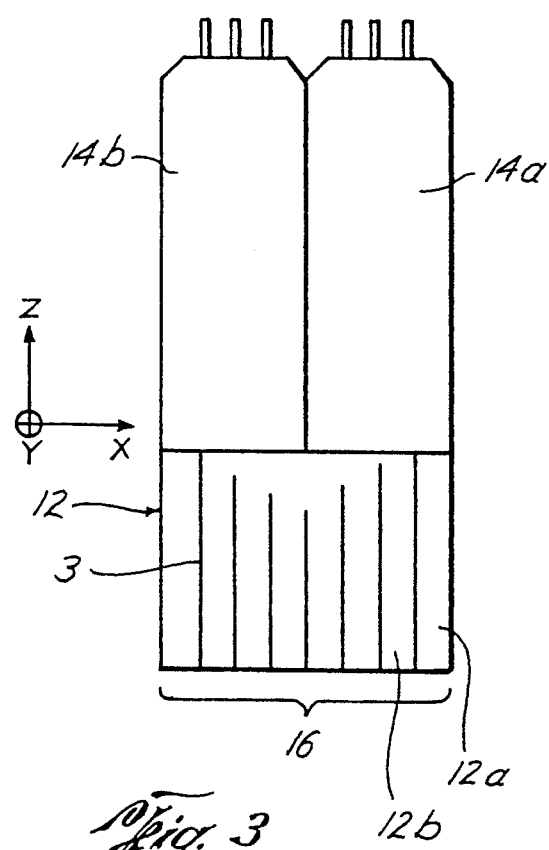
FIG. 3 is a perspective elevational view of one row of crystals placed adjacent to light detectors in a non-offset configuration of a conventional PET camera design.
Figure 4:
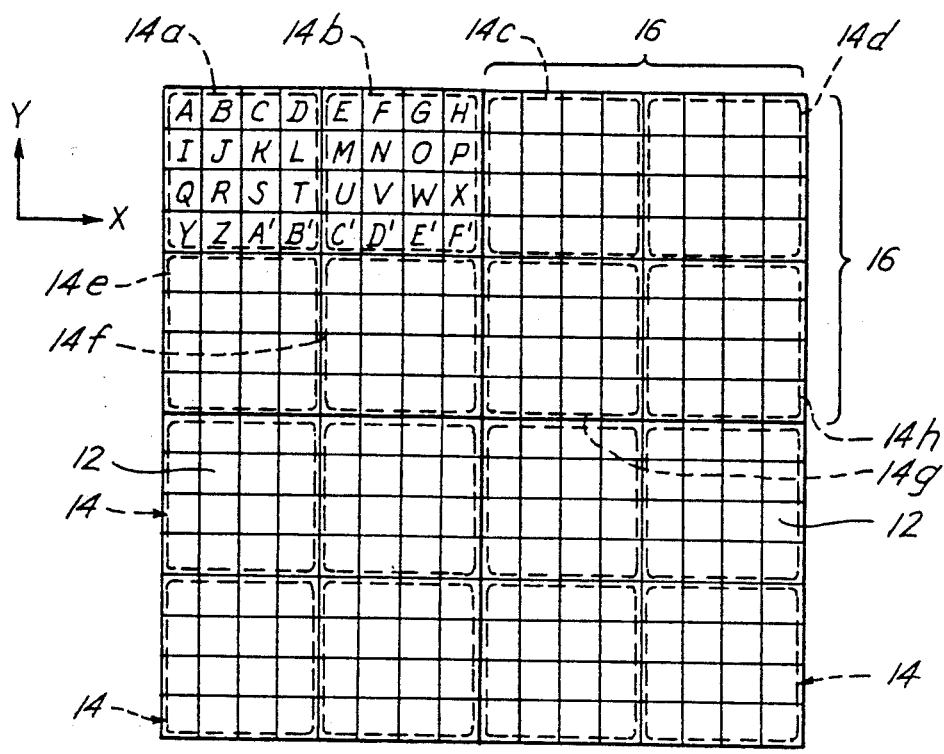
FIG. 4 is a schematic view of crystals and light detectors arranged according to a conventional PET camera design and shown along a plane perpendicular to the viewing plane of FIG. 3.

While the invention is susceptible to various modifications and alternative forms, the specific embodiment thereof has been shown by way of example in the drawings and will herein be described in detail. It should be understood, however, that the drawings are not intended to limit the invention to the particular form disclosed, but on contrary, the intention is to cover all modifications, equivalents and alternatives falling within the spirit and scope of the invention as defined by the appended claims.

DETAILED DESCRIPTION OF THE INVENTION

In a PET camera, a positron isotope, such as Rb82, F-18-deoxyglucose tracer (FDG) or thymidine, is injected into a patient and each positron isotope atom then produces two gamma rays moving in opposite directions. The detector ring then captures these gamma rays to produce an image of the isotope tracer distribution. Various forms of positron isotope may be used in the present invention. Generally, isotope is chosen as having a fairly short half-life. Such isotopes generally lose half of their radioactivity within minutes or hours of creation. As such, PET scanning must occur soon after injection of the isotope.

By arranging the detector ring about the patient's body, location of each energy flash arising from the positron-electron annihilation can be recorded along a plane between the ring of detectors. Thus, two-dimensional slice diagrams of the flash point can be produced indicating the area of interest.

Figure 5:
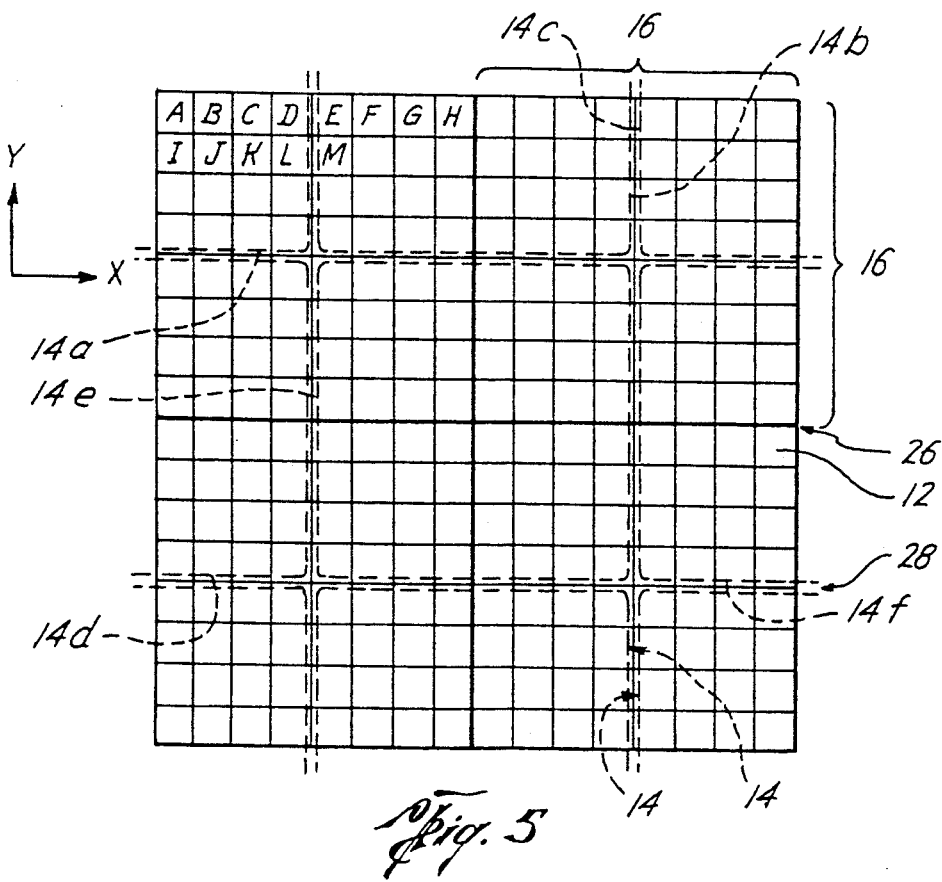
FIG. 5 is a schematic view of crystals and light detectors arranged according to the present invention.

Turning now to the drawings, FIG. 5 illustrates a plurality of crystals 12 arranged in an array 16. Each array may comprise of numerous crystals arranged in a matrix. As an example, each array may include at least sixty-four crystals arranged in an 8 ×8 matrix. Each array 16 of crystals 12 can be configured to occupy one quadrant of four adjacent light detectors or PMTs 14. Each PMT 14 can thereby be placed adjacent four adjacent quadrants of four respective arrays 16. Each array quadrant is selected from four different arrays. The resulting crystal/PMT configuration ensures that edges 26 of each array 16 are not immediately adjacent to the PMT edges 28. The edges between PMTs and the edges between crystal arrays 16 are therefore offset from each other to allow a single PMT to detect light from each of four crystal arrays.

Crystals 12 may be of any suitable type, such as BGO crystals, and a suitable light detector 14 may be a photomultiplier tube or silicon photodiode. Each crystal may be cut from a large crystal ingot of scintillation material. The resultant crystal can be tested to ensure its compatibility with adjacently placed crystals so that the performance of the resulting array is consistent throughout the array and between adjacent arrays. The separate crystals can be selectively coupled (i.e., glued or banded) together with substantially no gaps therebetween to form a block or array of crystals.

An advantage in cutting separate crystals from a large chunk of crystal material is that the resulting separate crystal can be mixed and matched with adjacent crystals to optimize performance of the detector. It is important that the crystals within a block are internally arranged so that their characteristic performance remains consistent between adjacent crystals in that block. Moreover, manufacture of separate crystals can be more cost efficient. For example, if crystals of 2 mm thickness are cut from a bulk material of 15 mm thickness, seven crystals can be formed (with 1 mm waste) and five crystals coupled adjacent each other to form a block of 10 mm thickness. The remaining two crystals can be added to an adjacent block. Conversely, if a block of 10 mm thickness is cut from the bulk material of 15 mm thickness, 5 mm crystal is left as waste. A further advantage of using separate crystals rather than crystals formed between cuts within a block, is that tightly bonded crystals do not have a gap or groove at the detector surface.

Accordingly, an important advantage of the present invention is that the crystals are not formed by cuts (typically uneven cuts) formed in a block. Instead, the present crystals are formed separately from an ingot and then selectively bonded to form an array. The resulting array does not have grooves left by the cutting blade width used in forming the slits for cuts between adjacent crystals as in conventional design. Instead, grooves (which are typically 0.3–0.4 mm) are eliminated by close adhesive bonding of separate crystals thereby increasing the detection surface area of the array. Moreover, the surface area of adjacent crystals can be selectively polished to optically cross-couple the crystals within the array. Cross-coupling determines the degree of optical cross-talks. To control the light distribution within the array, different cross-coupling optical adhesives are used within an array to fine tune the light distribution to an adjacent PMT.

Referring to FIG. 5, each PMT 14 can be made approximately the same size as an array of 64 crystals 12. Large PMTs can achieve accurate detection of scintillation within a scintillating crystal 12 by offsetting the edges between PMTs from the edges between each array. For example, if crystal H is scintillated, then photon energy will be detected in PMTs 14a, 14b, 14d and 14e. Photon energy is preferably directed across the entire array surface (between crystals of an array) since the array or block of the present invention utilizes light transmissive material placed between adjacent crystals within an array. Scintillation of crystal H will record more photon energy in PMT 14b than in the other three PMTs associated with the array. The relative proportion of photon energy recorded in each of the four array-sharing PMTs determines the X and Y location of scintillation within a given crystal 12. For example, if crystal M is scintillated, PMT 14b will record a majority of the photon energy, PMT 14a will read more energy than PMT 14e, and PMT 14d will read the least amount of energy. Accordingly, the relative proportion of energy indicates a fairly precise location of scintillation within each crystal within the array. A simple algorithm can be used to convert the relative proportion of photon energy recordable in four array-sharing PMTs into a two-dimensional location of the scintillating crystal. Instead of placing the entire PMT adjacent a quadrant of each array as in conventional detectors, the present invention can increase the size of each PMT such that each PMT can service all four quadrants of four different arrays simultaneously. Placement adjacent four quadrants allows a PMT to equal the size of an entire array. The array can have a dimension equal to or greater than 8×8 crystals or 64 crystals. Alternatively, instead of increasing the PMT size (and thereby reducing cost) the present invention can utilize smaller crystals for higher resolution applications.

Figure 6:
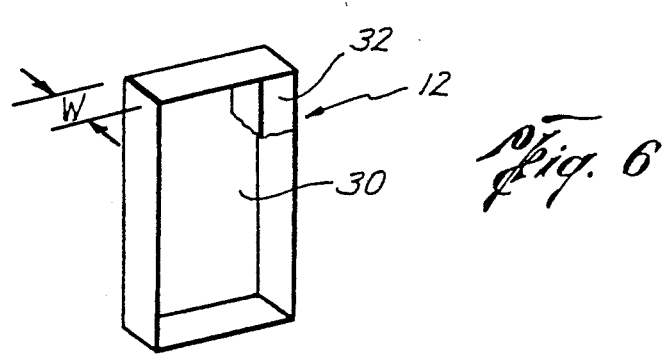
FIG. 6 is an enlarged perspective elevational view of a crystal with a polished surface finish and partially coated with radiation transparent adhesive according to the present invention.

Illustrated in FIG. 6 is a single crystal 12 cut from a bulk chunk of crystal material. The crystal may have one or more selected sides polished to allow more light to pass through the polished surface and into an adjacent crystal also may or may not have an adjacent polished surface 30. Not all sides need be polished. Instead, one or more sides may have selected frosted finish placed thereon so as to selectively decrease light from being transmitted therethrough. The desired light distribution is determined by the location and degree of polish and/or the location and degree of light controlling adhesive placed at the adjacent surfaces of crystals. Typically, resolution of the PET scanner is determined by the width of each crystal 12. Width, w, shown in FIG. 6 can range anywhere from 1–4 mm.

One or more sides of a selected crystal 12, or a partial side of a select crystal 12, may have a light transmitting adhesive 32 placed thereon. Adhesive 32 allows close bonding of adjacent crystals 12. Within an array 16, adhesives 32 of different refractive index may be used on different cross-coupling surfaces to provide additional light distribution control. Hence the cross-coupling finish and adhesive type will direct the photon energy between crystals 12 to adjacent PMTs associated with the array.

Figure 7:
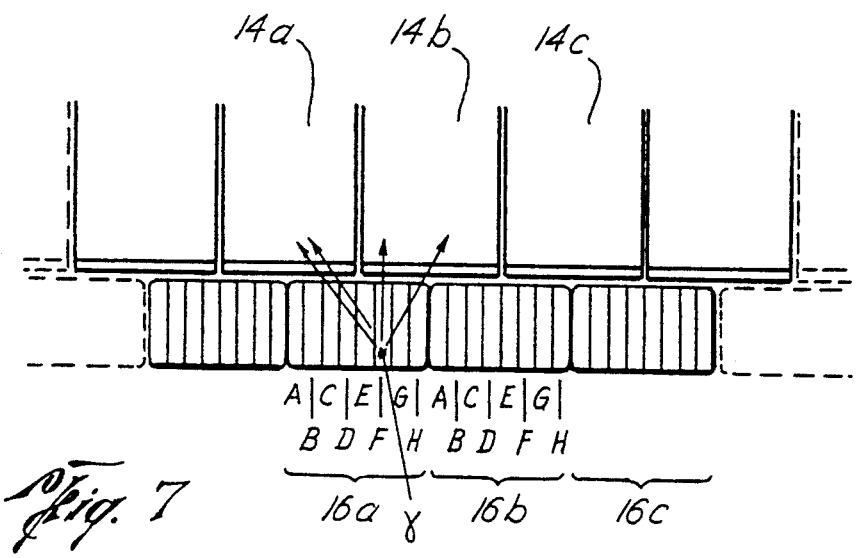
FIG. 7 is a row of crystals and light detectors arranged in a plane according to the present invention.

Referring to FIG. 7, a planar geometry of multiple arrays 16 are placed adjacent PMTs 14a-14c. A gamma ray is shown striking crystal 6 of array 16a. The resulting photon energy can be dispersed throughout the array and into PMT 14a and PMT 14b, depending upon the location of polished surfaces and light transmissive adhesives placed between crystals A-H of array 16a.

All PMTs have dead surface area which is not sensitive to light such as the glass side wall of the tube. Photon energy incident on the dead area will be absorbed and will not be registered as being detected. Thus, it is important that photon energy be directed away from the dead areas. This is done through selective placement of the polished surfaces and adhesives at the interface between crystals. Moreover, by offsetting the dead area (PMT wall) from the edge of the array, more flexibility is gained in directing the photon energy away from the dead area. If, for example, a gamma ray scintillates the last row or "end" crystal arranged in a non-offset pattern with the PMT (as in conventional designs), then a substantial portion of scintillation energy is lost when the edge absorbs the resulting photon energy. Conversely, by offsetting the edge of the array from the PMT dead area, as herein described, the crystal interface of the central crystals can be selectively polished and glued to direct the photon energy away from the adjacent dead area. In the offset configuration of the present design, all resulting crystal elements have substantially the same optical efficiency. Namely, gamma rays which strike any crystal within an array produce approximately the same amount of detectable photon energy regardless of where scintillation occurs. As opposed to conventional, non-offset designs which experience lesser optical efficiency at the edge of the array (due to adjacent dead area), the offset design herein can compensate or direct detectable energy away from the dead area to achieve substantially uniform efficiency across the entire array surface.

Figure 8:
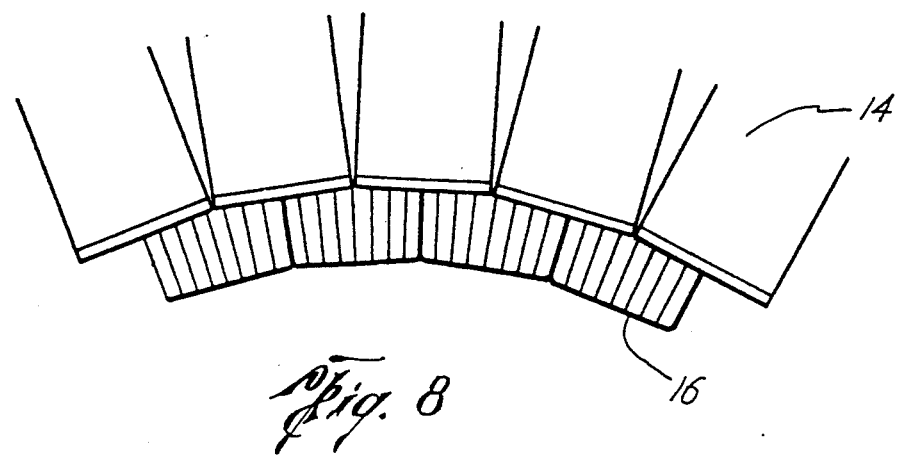
FIG. 8 is a row of crystals and lie detectors arranged in an arcuate path according to the present invention.

FIG. 8 illustrates a plurality of arrays or blocks 16 of crystals 12 placed adjacent a plurality of PMTs 14. The arrays 16 and PMTs 14 can be situated in an arcuate pattern, or curved pattern, which can completely encircle back upon itself to form a ring usable in a PET camera. The resultant ring can produce a series of planar images necessary to produce a three-dimensional diagram of the target area. Conversely, if arrays 16 and PMTs 14 are placed in a pair of planes arranged on opposing sides of a patient area, a two dimensional image may be formed of the target area. Two planar detectors placed on opposing sides of the target area are advantageously suited for quick detection of a neoplasm site at various locations within the patient's body. Two-dimensional detection using opposing planar surfaces can be performed independent of, or in conjunction with, three-dimensional detection using a ring of detectors. Thus, the detectors of FIG. 7 can be combined with the detectors of FIG. 8 to simultaneously track various target areas throughout the patient's body.

The foregoing description of the present invention has been directed to particular preferred embodiments. It will be apparent, however, to those skilled in the art that modifications and changes in both apparatus and method may be made without departing from the scope and spirit of the invention. For example, larger PMTs of approximately two inches square can be combined with crystals cut at a width of approximately 5-6 mm so as to reduce the number of PMTs and thereby lower the production costs of the PET camera. Conversely, a larger number of PMTs of smaller geometry (e.g., one inch square) can be combined with smaller crystals of approximately 2.4 to 2.8 mm to produce a higher resolution PET camera necessary for detecting small neoplasm function for tumor activity. By offsetting the edges of the crystal arrays with the edges of the PMTs, the present invention may achieve a PMT equal in size to an array. The present invention, therefore, is well adapted to increase the PMT/array (or block) size ratio, and to also increase the efficiency of the detector surface. Numerous changes in the details of construction and arrangement of parts will be readily apparent to those skilled in the art, and which are encompassed within the spirit of the invention and the scope of the appended claims.

What is claimed is:

1. A positron emission tomography camera comprising:
   a plurality of arrays of scintillation crystals placed in an arcuate position with adjacent arrays and adapted to surround a patient area; and
   a plurality of light detectors positioned adjacent said plurality of arrays, each light detector being adjacent one quadrant of each of four adjacent arrays.

2. The apparatus as recited in claim 1, wherein each array comprises at least sixty-four scintillation crystals.

3. The apparatus as recited in claim 1, wherein each light detector is adapted to receive light from said four adjacent arrays in proportion to a location within each array from which said light is emitted.

4. The apparatus as recited in claim 1, wherein said crystals are separate from each other and closely bonded together by a light controlling adhesive selectively placed between selected scintillation crystals.

5. The apparatus as recited in claim 1, wherein each said scintillation crystal comprises four sides and two ends.

6. The apparatus as recited in claim 5, wherein a light controlling adhesive is placed upon at least a portion of one of said sides of selected said crystals.

7. The apparatus as recited in claim 5, wherein at least a portion of one said sides is a polished surface.

8. A positron emission tomography camera comprising:
   first and second planar members arranged on opposing sides of a patient area, each planar member including a plurality of adjacent arrays of scintillation crystals; and
   a plurality of light detectors positioned adjacent said plurality of arrays in each planar member, each light detector being adjacent one quadrant of each of four adjacent arrays.

9. The apparatus as recited in claim 8, wherein each array comprises at least sixth-four scintillation crystals.

10. The apparatus as recited in claim 8, wherein each light detector is adapted to receive light from said four adjacent arrays in proportion to a location within each array from which said light is emitted.

11. The apparatus as recited in claim 8, wherein said crystals are separate from each other and bonded together by a light transparent adhesive selectively placed between selected scintillation crystals.

12. The apparatus as recited in claim 8, wherein each said scintillation crystal comprises four sides and two ends.

13. The apparatus as recited in claim 12, wherein a light controlling adhesive is placed upon at least a portion of one of said sides of selected said crystals.

14. The apparatus as recited in claim 12, wherein at least a portion of one said sides is a polished surface.

15. A method of detecting tumors within a patient, comprising:
    receiving gamma rays from a patient upon a plurality of scintillation crystals,
    said scintillation crystals being arranged in arrays of individual crystals;
    converting said gamma rays striking each of said crystals to photon energy detectable by four adjacent light detectors,
    wherein each said light detector is adjacent one quadrant of each of four adjacent arrays; and
    isolating a location of a tumor according to a proportion of photon energy detected by each of said four light detectors.

16. The method of claim 15, wherein each said array comprises at least sixty-four individual crystals.

17. The method of claim 15, wherein selected said crystals have at least one polished surface and selected said crystals are bonded together with a light controlling adhesive, the method comprising controlling a spread of said photon energy within an array through said selective bonding and polishing.

18. A positron emission tomography camera comprising:
    a plurality of adjacent arrays of scintillation crystals configured to enclose a patient area,
    wherein said arrays each comprise at least sixty-four individual scintillation crystals closely held together in each said array by a light controlling adhesive selectively placed between selected scintillation crystals in each said array; and
    a plurality of light detectors positioned adjacent said plurality of arrays, each light detector being adjacent on quadrant of each of four adjacent arrays,
    wherein each light detector is adapted to convert received light from said four adjacent arrays to an electrical signal in proportion to a location within each array from which said light is emitted.

19. The apparatus as recited in claim 18, wherein selected said crystals in selected said arrays have at least one polished surface.

20. A method of detecting tumors within a patient, comprising:
    providing a plurality of scintillation crystals being arranged in arrays of at least sixth-four individual crystals
    receiving gamma rays from a patient upon a plurality of said scintillation crystals;
    converting said gamma rays striking each of said crystals to photon energy detectable by four adjacent light detectors, each said light detector being adjacent one quadrant of each of four adjacent arrays;
    controlling a spread of said photon energy within an array through selective bonding and polishing, wherein selected said crystals have at least one polished surface and selected said crystals are bonded together with a light controlling adhesive;
    isolating a location of a tumor according to a proportion of photon energy detected by each of said four light detectors.

21. The apparatus as recited in claim 2, wherein said crystals are BGO or light-output-equivalent crystals.

22. The apparatus as recited in claim 9, wherein said crystals are BGO or light-output-equivalent crystals.

23. The apparatus as recited in claim 16, wherein said crystals are BGO or light-output-equivalent crystals.

24. The apparatus as recited in claim 18, wherein said crystals are BGO or light-output-equivalent crystals.

25. The apparatus as recited in claim 20, wherein said crystals are BGO or light-output-equivalent crystals.

* * * * *

UNITED STATES PATENT AND TRADEMARK OFFICE
CERTIFICATE OF CORRECTION

PATENT NO. : 5,319,204
DATED : June 7, 1994
INVENTOR(S) : Wai-Hoi Wong

It is certified that error appears in the above-indentified patent and that said Letters Patent is hereby corrected as shown below:

In claim 9, column 8, line 57, delete "sixth-four" and insert --sixty-four-- therefor.
In claim 18, column 10, line 3, delete "on" and insert --one-- therefor.
In claim 20, column 10, line 14, delete "sixth-four" and insert --sixty-four-- therefor.

Signed and Sealed this

Thirtieth Day of August, 1994

Attest:

BRUCE LEHMAN

Attesting Officer

Commissioner of Patents and Trademarks